United States Patent

Farrier et al.

Patent Number: 5,703,639
Date of Patent: *Dec. 30, 1997

[54] CHARGE COUPLED DEVICE PULSE DISCRIMINATOR

[75] Inventors: Michael G. Farrier, Redwood Shores, Calif.; Stacy R. Kamasz, Waterloo; Fred S. F. Ma, Scarborough, both of Canada; Mark P. Bendett, Ann Arbor, Mich.

[73] Assignees: Dalsa, Inc., Waterloo, Canada; Imra America, Inc., Ann Arbor, Mich.

[*] Notice: The term of this patent shall not extend beyond the expiration date of Pat. No. 5,585,652.

[21] Appl. No.: 328,923

[22] Filed: Oct. 25, 1994

[51] Int. Cl.$^6$ ...................................................... H04N 5/335
[52] U.S. Cl. .......................... 348/241; 348/250; 348/296; 348/319; 348/320; 348/321
[58] Field of Search .............................. 348/296, 311, 348/316, 317, 319, 320, 321, 322, 323, 324, 135, 138, 139, 140, 241, 243, 244, 245, 246, 247, 250, 297, 298; H04N 7/18, 5/335

[56] References Cited

U.S. PATENT DOCUMENTS

| | | |
|---|---|---|
| 4,301,471 | 11/1981 | Holscher et al. ................ 358/105 |
| 4,476,568 | 10/1984 | Prince ................................ 377/60 |
| 4,488,172 | 12/1984 | Hutchin ............................. 358/107 |
| 4,584,609 | 4/1986 | Klein et al. ....................... 358/213 |
| 4,837,630 | 6/1989 | Ueda ............................. 358/213.26 |
| 5,056,914 | 10/1991 | Kollodge ............................... 356/5 |
| 5,148,013 | 9/1992 | Yamada ........................... 250/208.1 |
| 5,162,861 | 11/1992 | Tamburino et al. ................. 356/5 |
| 5,177,614 | 1/1993 | Kawaoka et al. ............. 358/213.22 |
| 5,298,734 | 3/1994 | Kokubo ........................... 250/208.1 |
| 5,398,060 | 3/1995 | Leacock et al. ................... 348/241 |
| 5,420,629 | 5/1995 | Watanabe .......................... 348/207 |
| 5,585,652 | 12/1996 | Kamasz et al. .................... 257/231 |

*Primary Examiner*—Andrew Faile
*Assistant Examiner*—Ngoc-Yen Vu
*Attorney, Agent, or Firm*—Burns, Doane, Swecker & Mathis, LLP

[57] ABSTRACT

Accordingly, the present invention is directed to providing methods and apparatus for detecting light energy in real-time while minimizing the effects of background charge accrual on the charge-coupled device. Exemplary embodiments provide relatively fast electronic shuttering and exposure control to minimize accrual of unwanted background illumination. Further, exemplary embodiments can be operated at relatively high speeds without increasing the complexity of electronics used to drive the charge-coupled device or process information produced by the charge-coupled device.

15 Claims, 10 Drawing Sheets

CHARGE COUPLED DEVICE PULSE DISCRIMINATOR

BACKGROUND OF THE INVENTION

1. Field of the Invention

The present invention relates generally to methods and apparatus for detecting light energy using light sensitive devices such as charge-coupled device (CCD) imaging arrays, and in particular to methods and apparatus for accurately detecting light signals, under conditions where low signal-to-noise ratios exist, using high speed exposure control of the charge-coupled device imaging array.

2. State of the Art

Devices and systems for detecting transmitted light energy are relatively well known and are used, for example, in laser radar systems. In laser radar systems a reflected pulse of light energy (e.g., laser pulse) is detected by a light sensitive device (e.g., charge-coupled device imaging array). The lateral position of the detected pulse on an array of the charge-coupled device can be used to provide information regarding the position of an object which reflected the pulse. In situations where the laser radar system is fixed, stationary or moving objects can be detected. The laser radar system can also be mounted on a moving platform such as a vehicle and used to track the movement and position of the vehicle and/or the movement and position of objects around the vehicle.

To be practical, laser radar systems should operate in real-time at high speeds. However, conventional charge-coupled device imaging arrays suffer performance drawbacks as their speed of operation is increased. Conventional imaging arrays often encounter difficulty in accurately detecting the reflected laser pulse when its total energy is relatively low in comparison with unwanted ambient illumination which is accumulated by the imaging array along with the laser pulse energy.

Ambient illumination caused by any natural or artificial light source in a vicinity of the imaging array can produce background noise. For example, ambient illumination due to sunlight, room light or shot noise from the laser pulse emission, can produce background illumination. As the relative energy of the reflected laser pulse (i.e., determined by optical power and pulse duration) is decreased, conventional detection devices have difficulty distinguishing the laser pulse from background illumination. Because background illumination is continuous and generally non-uniform across the imaging array, small fluctuations in the background illumination can be improperly detected as the laser pulse. Further, large fluctuations in background which occur slowly over time with respect to the laser pulse duration (e.g., background fluctuations on the order of milliseconds relative to laser pulse durations on the order of nanoseconds) can result in mischaracterization of background noise as the laser pulse.

Techniques for discriminating background illumination from the laser pulse typically acquire an accumulated first signal from the imaging array which represents a combination of the laser pulse superimposed on the background illumination. Either prior to or soon after acquiring the superimposed signal, a second signal can be obtained from the detection device which represents only the background illumination. The second signal representing background illumination can then be subtracted from the first signal, leaving a differential signal assumed to be proportional to the laser pulse energy.

A differentiating output amplifier can provide a high speed difference signal without adding complexity to the signal processing scheme of conventional techniques. If the incident light from a laser pulse is confined laterally to a first pixel "n" in a charge-coupled device array, the differential amplifier can subtract the background illumination accumulated in a second, separate pixel immediately adjacent the first pixel (i.e., pixel "n−1" or pixel "n+1") thereby leaving only the signal associated with the difference between the laser signal plus its background signal and the background signal from the adjacent pixel.

However, known techniques for discriminating a signal of a interest (e.g., laser pulse) from background illumination do not fully address all conditions which affect signal-to-noise ratio. For example, such techniques operate on the assumption that background illumination will not have changed substantially between times at which the first and second signals were acquired (e.g. it is assumed that shot noise due to emission of the laser pulse is negligible). Regardless of whether digital or analog signal processing is used, high-speed electronics required to process the acquired data produce additional system noise which further degrades signal-to-noise ratios.

In addition, conventional techniques do not account for background illumination which is non-uniform across pixels of the imaging array (e.g., sharp variations in background illumination from pixel to pixel can be falsely detected as a laser pulse). Other factors which can produce non-uniform background illumination from one pixel to another include non-uniform characteristics of the pixels themselves. For example, pixel response non-uniformity (PRNU) or fixed pattern noise (FPN) can cause pixels to produce different electrical signal outputs in response to the same level of illumination. Because signals of interest are not necessarily confined laterally to a single pixel, the effects of pixel response non-uniformity and fixed pattern noise, or the existence of large variations in the background illumination, can result in ambiguous signal detection which becomes aggravated as the signal-to-noise ratio is further degraded.

Further, conventional imaging arrays are unable to minimize accrual of background illumination due to their inability to provide fast electronic shuttering and exposure control. This inability to operate at high speeds is aggravated when multiple events must be detected in succession for real-time applications (i.e., two lines from a current event must be read out before two lines from a subsequent event can be binned and read out). The inability of conventional devices to operate at high speeds for real-time applications is further inhibited by the complexity associated with off-chip electronics used to drive conventional charge-coupled devices and to process acquired data. Post processing electronics are unable to provide the speed and sensitivity required to accurately detect an incident signal of interest without substantially increasing system complexity.

SUMMARY OF THE INVENTION

The present invention is therefore directed to providing methods and apparatus for detecting light energy in real-time while minimizing the effects of background illumination on the charge-coupled device sensing array. Exemplary embodiments provide relatively fast electronic shuttering and exposure control to minimize accrual of unwanted background illumination. Further, exemplary embodiments can be operated at relatively high speeds without increasing the complexity of electronics used to drive the charge-coupled device or to process information produced by the charge-coupled device. Further, a signal of interest (e.g., a laser pulse) can be accurately detected even when the input signal-to-noise ratio is relatively low using on-chip differential combining of a first signal, representing a signal of interest superimposed on background illumination, and a second signal, representing only background illumination from the same (as opposed to an adjacent) photosensitive element (pixel).

Exemplary embodiments detect light energy by accumulating photocharge from a pulse of light energy incident on a photocharge accumulating means during a first sample time, said accumulated light energy being transferred to a storage element of said accumulation means upon completion of said sample time, by transferring said first photocharge from said accumulating means to a storage means with all photogenerated photocharge from an area of photocollection elements in said accumulation means being combined (i.e., binned) into one site, and by controlling exposure of the accumulating means to light energy by enabling the accumulating means to detect light energy in response to detected emission of the light energy pulse.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

In accordance with an exemplary embodiment, an apparatus for detecting light energy includes a means for accumulating a first photocharge from a pulse of light energy incident on the accumulating means during a first sample time. The photocharge accumulating means can be implemented in a manner as illustrated in FIG. 1.

Figure 1:
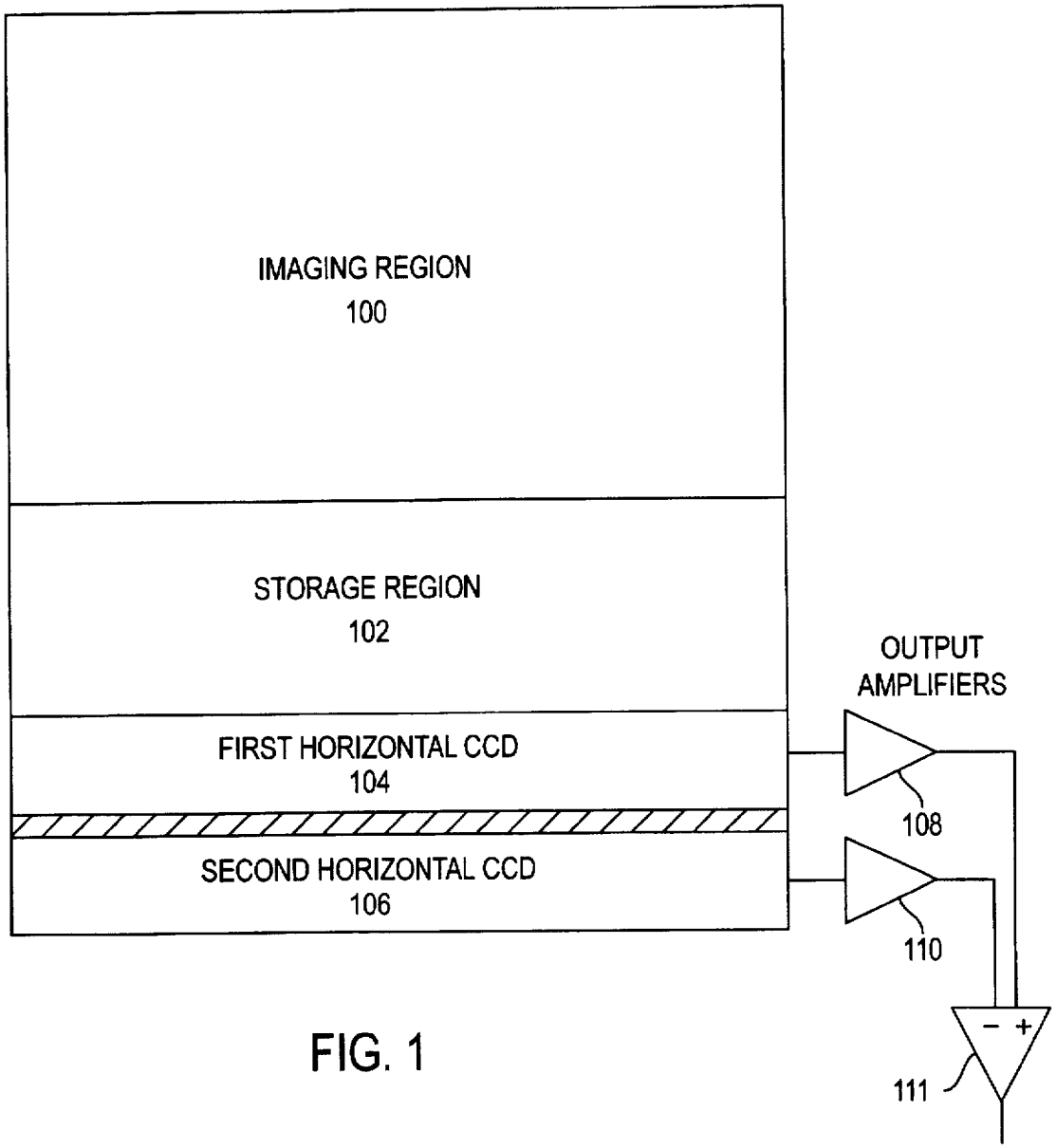
FIG. 1 illustrates an exemplary embodiment of a charge-coupled device imaging array in accordance with an exemplary embodiment of the present invention.

In FIG. 1, the light energy detecting apparatus is an image sensor which includes an accumulating means represented as imaging region 100. In an exemplary embodiment, imaging region 100 is a two-dimensional array of interline transfer pixels. The array of interline transfer pixels can transfer photocharge from photocharge accumulation areas of a given pixel to a storage element (e.g., vertical shift register) of the accumulating means. The vertical shift register can be used to transfer photocharge to a storing means represented as storage region 102, with all charge collected in the multiple stages (i.e., sites) of the vertical shift register being summed (binned) for storage into a single site of the storage region 102, the vertical shift register being covered by an opaque metal strip to inhibit accrual of photocharge therein during read-out of photocharge from the imaging region to storage region 102.

In accordance with the exemplary FIG. 1 embodiment, the storage region 102 can include plural rows of photocharge storing elements (i.e., plural rows of storage sites), with the number of rows corresponding to twice the number of successive events to be detected during bursts of emitted pulses of light energy (i.e., each emitted laser pulse can be considered an event). By including a plurality of rows, or lines, in the storage region 102, multiple events can be detected in succession, with the photocharge from each event being integrated and stored. By storing two lines of photocharge, in any order, for each event (i.e., one line of photocharge which includes the laser pulse superimposed on background illumination, and a second line wherein only background illumination is stored), two lines of pixels associated with each event can be read-out. Because the time period between bursts can be set relatively long, read-out can occur during the time period between bursts.

The two lines of photocharge for each event stored in storage region 102 can be transferred to a read-out means represented in FIG. 1 as a first horizontal charge-coupled device 104 and a second, separate horizontal charge-coupled device 106. In accordance with an exemplary embodiment, the first horizontal charge-coupled device 104 can be used to store a first photocharge accumulated by the accumulating means during a first sample time (e.g., including a laser pulse superimposed on background illumination), while the second horizontal charge-coupled device 106 can be used to store a second photocharge accumulated by the accumulating means during a second sample time (i.e., background illumination alone).

Photocharge transferred form the storage region to each of the first and second horizontal charge-coupled devices can be subsequently transferred to a means for generating a differential output proportional to a difference between the first photocharge and the second photocharge. For example, in accordance with the exemplary FIG. 1 embodiment, the generating means can include a first buffer output amplifier 108 and a second buffer output amplifier 110 and a third differential amplifier 111 for differentially combining the first and second photocharges. In accordance with the present invention, the accumulating means, storing means and differential combining means can be formed on a single substrate to improve the signal-to-noise ratio.

A means for controlling exposure of the accumulating to light energy by enabling said accumulating means to detect light energy in response to detected emission of a light energy pulse can also be provided. For example, an exposure controlling means can be a clock signal generator used to control the transfer of photocharge from the imaging region 100 to the storage region 102 and into the first and second horizontal charge-coupled devices for subsequent differential combination in the differential output amplifier 111.

Figure 2:
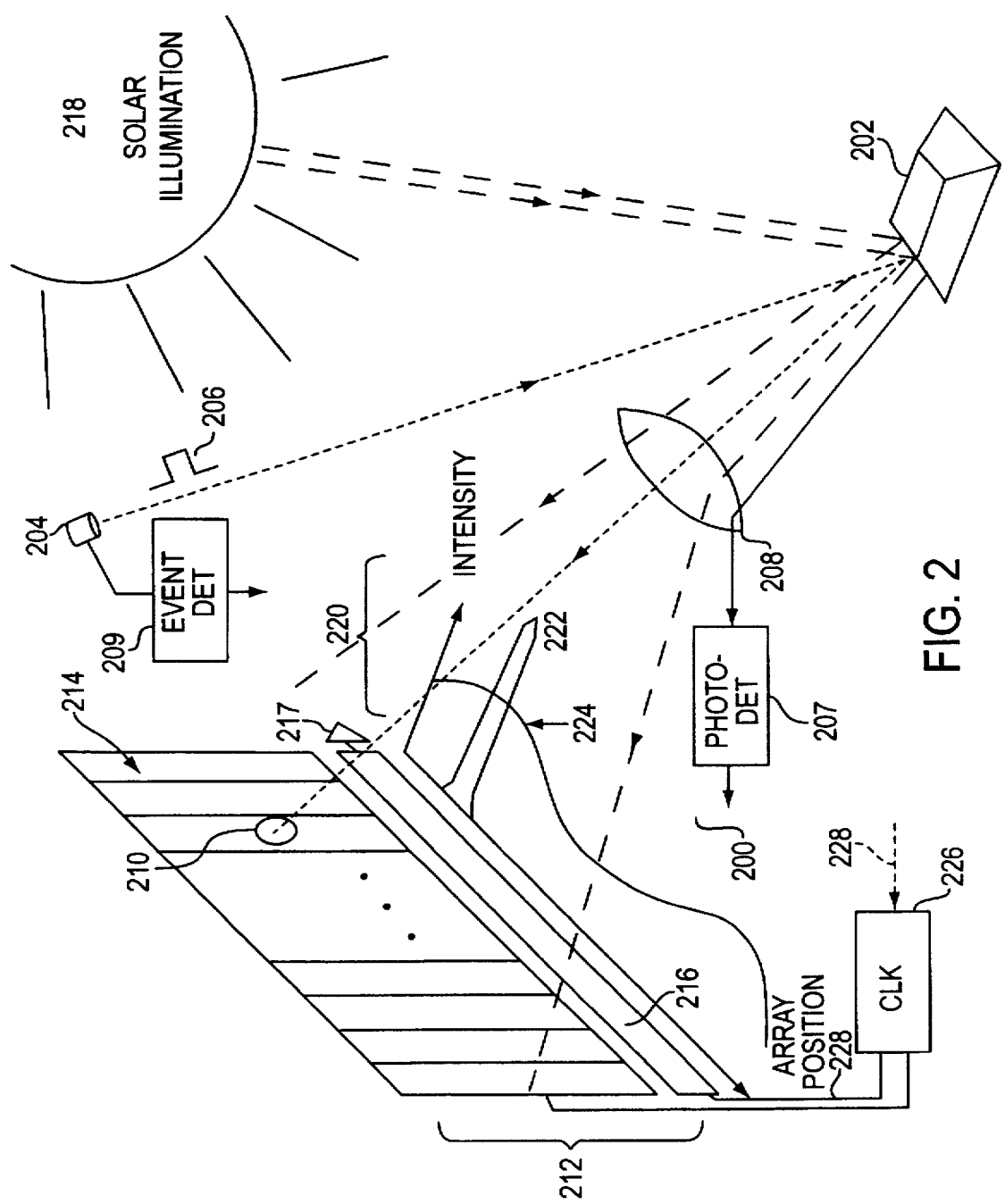
FIG. 2 illustrates a laser radar system which can include an imaging array in accordance with an exemplary embodiment of the preset invention.

FIG. 2 shows an exemplary system, such as a laser radar system 200 for detecting an object, such as a reflector 202, using light energy in accordance with an exemplary embodiment of the present invention. The laser radar system includes a means for emitting light energy, represented as a laser diode 204. The laser diode 204 emits a signal of interest represented as a monochromatic laser pulse 206 which is reflected by reflector 202. In accordance with exemplary embodiments, the reflector 202 can be any target, including both cooperative targets (e.g., highly reflective surfaces), semi-cooperative targets (e.g., moderately reflective surfaces such as automotive taillight assemblies) or uncooperative targets (e.g., high light absorbent targets, such as a person).

Laser radar system 200 also includes means for detecting light energy emitted from the laser diode 204. For example, an exemplary detecting means can be an apparatus which includes means for focusing pulsed light energy reflected from reflector 202, such as an optical system 208. The optical system can include one or more lenses for focusing reflected light energy from the reflector as a return spot 210 on a focal plane of an image sensor 212 in the light energy detecting apparatus.

Those skilled in the art will appreciate that the exemplary FIG. 2 embodiment, when configured as a laser radar system, can be used to detect both range and orientation (i.e., relative to a reference plane) of the reflector. For example, in addition to detecting position of an object in a manner as described above, other known techniques of position detection can be used in accordance with the exemplary FIG. 2 embodiment including, but not limited to, triangulation. Those skilled in the art will appreciate that triangulation is a well known technique whereby a collimated beam emitted from laser diode 204 is focused on the focal plane of imaging array 212 after reflection by reflector 202. The lateral position of the return spot 210 on the focal plane is a function of relative position of laser emitter 204 and reflector 202.

In accordance with an exemplary embodiment, the image sensor 212 can be a charge-coupled device which includes an array of pixels 214, each pixel having one or more photoelements for accumulating photocharge. The pixels 214 can be any device capable of storing light energy (i.e., photocharge) and outputting an electrical signal proportional to the stored light energy, including but not limited to, n+ photodiodes, n− pinned photodiodes, time-delay and integration (TDI) photogates, or interline transfer (ILT) type pixels as described with respect to FIG. 1. By detecting the pixel upon which a reflected light signal of interest (i.e., reflected laser pulse 206) is incident, a lateral position of the reflected pulse on the focal plane of imaging array 212 can be determined and used to detect the position and physical detail of the reflector 202.

The exemplary light energy detecting means further includes means for storing photocharge which has been accumulated by summing or binning charge in the pixels 214, such as storage region 102 of FIG. 1, and read-out means. In accordance with exemplary embodiments, the read-out means can be a horizontal charge-coupled device 216 for transferring stored photocharge to a photocharge combining means represented in FIG. 2 as a read-out amplifier 217 for generating a differential output.

Ambient background illumination, which can include sunlight or light from any other natural or artificial source (i.e., any light energy other than the signal of interest emitted by the laser diode 204, including shot noise) is represented in FIG. 2 as solar illumination 218. Because light from the ambient illumination is also reflected by reflector 202, it is focused by the optical system 208 onto the focal plane of image sensor 212. A spatial variation of light across the image sensor 212 is illustrated graphically in FIG. 2 with a graphical plot 220 of optical power incident on each pixel at a given instant in time (y-axis) versus spatial position along an x-axis of the array. A superposition of the reflected light energy 222 due to the laser pulse emitted from the laser diode 204 and the reflected background illumination 224 from ambient sources is incident on the focal plane of the imaging array 212 as represented by the plot 220.

The FIG. 2 embodiment further includes an exposure control means represented as a clock signal generator 226 for clocking the array of pixels in the image sensor 212 to transfer the first photocharge accumulated in at least one pixel of the image sensor 212 to a first stage of the storage device 216. Similarly, the clock signal used to perform this transfer can be used to transfer photocharge from each of the pixels to different stages of the storage device. The exposure control means further includes a signal line 228 for initiating a sample time which enables the accumulating means to detect light energy in response to detected emission of the light energy pulse.

In accordance with an exemplary embodiment, the means for controlling exposure of the accumulating means to light energy can include a photodiode 207 at the optical system 208 to sense arrival of a laser pulse, and thereafter trigger external electronics via signal line 228 to disable exposure control of the image sensor 212 (i.e. enable the image sensor 212 to acquire a line of data from incident light energy). Alternately, an event detector 209 can be included in the vicinity of the laser diode 204 to detect emission of a laser pulse for triggering external electronics via signal line 228 to enable the image sensor 212.

By enabling the clock signal generator in response to event detection, exposure control between laser pulse events can be turned on to inhibit further accumulation of photocharge, and to remove any residual photocharge in a given pixel via a drain. Further, by enabling the clock signal generator to accurately control exposure of the image sensor to incident light, the image sensor can be regulated to only accumulate incident light during sampling periods of time when a laser pulse is incident on the array, after which the image sensor can be disabled at approximately the same time a transfer of photocharge from a pixel in the image sensor to a vertical shift register of the charge-coupled device is complete. This process can be used to minimize any amount of background charge superimposed with a laser pulse of interest on the image sensor, thereby mitigating affects of high background illumination.

The exposure control sampling process can be repeated to acquire a frame of background illumination for comparison with the superimposed background illumination and laser pulse. In alternate embodiments where high speed shuttering of the image sensor is desired, a high speed image sensor such as the split pixel interline transfer image sensor described in co-pending U.S. application Ser. No. 08/328, 922, filed Oct. 25, 1994, Attorney Docket No. 000401-103, entitled "Split Pixel Interline Transfer Image Sensor" can be used, the disclosure of which is hereby incorporated by reference.

Although the exemplary embodiment described with respect to FIG. 2 can be used to detect the location of an incident laser pulse on the image sensor 212 and to provide information regarding relative position of the reflector 202 with respect to the image sensor 212 and laser diode 204, it will be appreciated that an ability to provide exposure control in accordance with exemplary embodiments of the present invention can be used in any number of additional applications.

For example, by accurately controlling the image sensor to shutter exposure to incident light, the image sensor can be gated open for charge accumulation during a predetermined sample time representing a brief window during which an incident laser pulse is expected (i.e., assuming a given round trip time-of-travel to a particular target for a laser pulse emitted a predetermined time). If the return pulse is detected within the window period, a determination can be provided that an expected range to the target was accurate. Using relatively fast control of image sensor exposure to incident light, range to a given target can therefore be provided with relatively high accuracy (e.g., on the order of a few meters or better). Thus, both range to the target (e.g., reflector 102) and relative orientation (e.g., azimuth) of the target can be determined.

Figure 3:
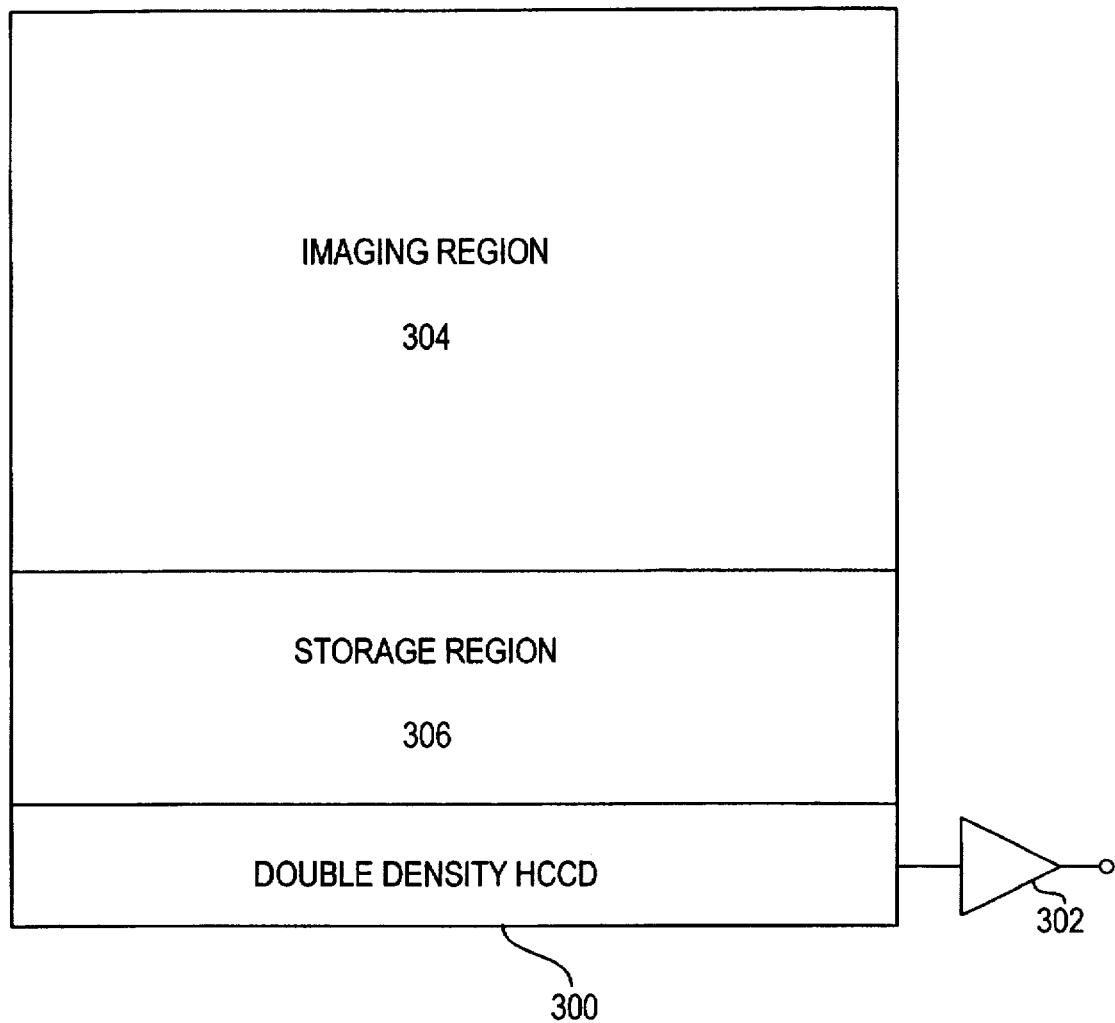
FIG. 3 illustrates an alternate embodiment of the charge-coupled device imaging array.

Those skilled in the art will appreciate that the exemplary embodiments of FIGS. 1 and 2 are by way of example only, and that numerous alternate embodiments can be implemented to achieve light energy detection in accordance with the present invention. For example, FIG. 3 illustrates an alternate exemplary embodiment which includes an imaging region 304 and a storage region 306. In contrast to the FIG. 1 embodiment, a single, double-density horizontal charge-coupled device 300 is provided for storing, in any order, both the first charge and the second charge described with respect to FIG. 1.

Outputs from the double-density horizontal charge-coupled device 300 can be provided to an on-chip generating means which includes a single differential output amplifier 302 as described in co-pending U.S. application Ser. No. 08/328,921, filed Oct. 25, 1994, (Attorney Docket No. 000401-102), entitled "Method and Apparatus for Real-Time Background Illumination Subtraction", the disclosure of which is hereby incorporated by reference in its entirety.

Figure 4:
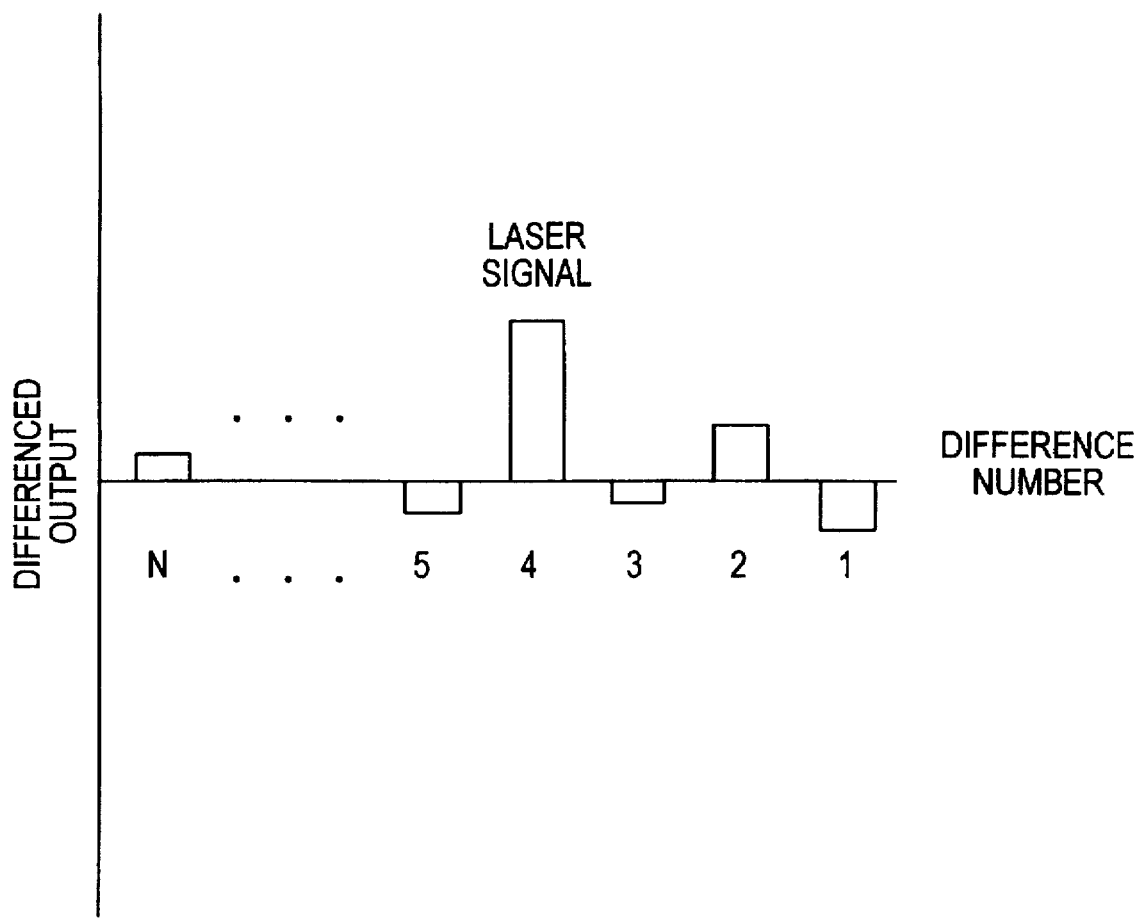
FIG. 4 illustrates detection of a weak-signal of interest in accordance with the present invention.

FIG. 4 illustrates light energy detection in accordance with the exemplary embodiments described. As illustrated in FIG. 4, a differential output of the differential amplifier (e.g., differential output amplifier 302 in FIG. 3) produces a number of different outputs for each of the events 1 through N (i.e, each differential output corresponding to a difference between a superimposed light pulse on background illumination and background illumination alone) collected from the same photosite (as opposed to adjacent photosites).

In non-ideal situations, some change in the background signal will occur between acquisition of the first photocharge (i.e., laser pulse superimposed on background illumination) and the time at which a second signal (i.e, reference background illumination) is acquired. For this reason, differences produced by the differential output amplifier are not zero for pixels where no laser pulse is incident on the image sensor.

It will be appreciated that in the exemplary FIG. 4 illustration, it is assumed that a laser pulse is incident on a single pixel of the image sensor, and that any variations in background illumination are smaller than the magnitude of a smallest laser pulse incident on the image sensor. In accordance with exemplary embodiments, a laser pulse can be adequately discriminated from background illumination to provide accurate detection.

Figure 5A:
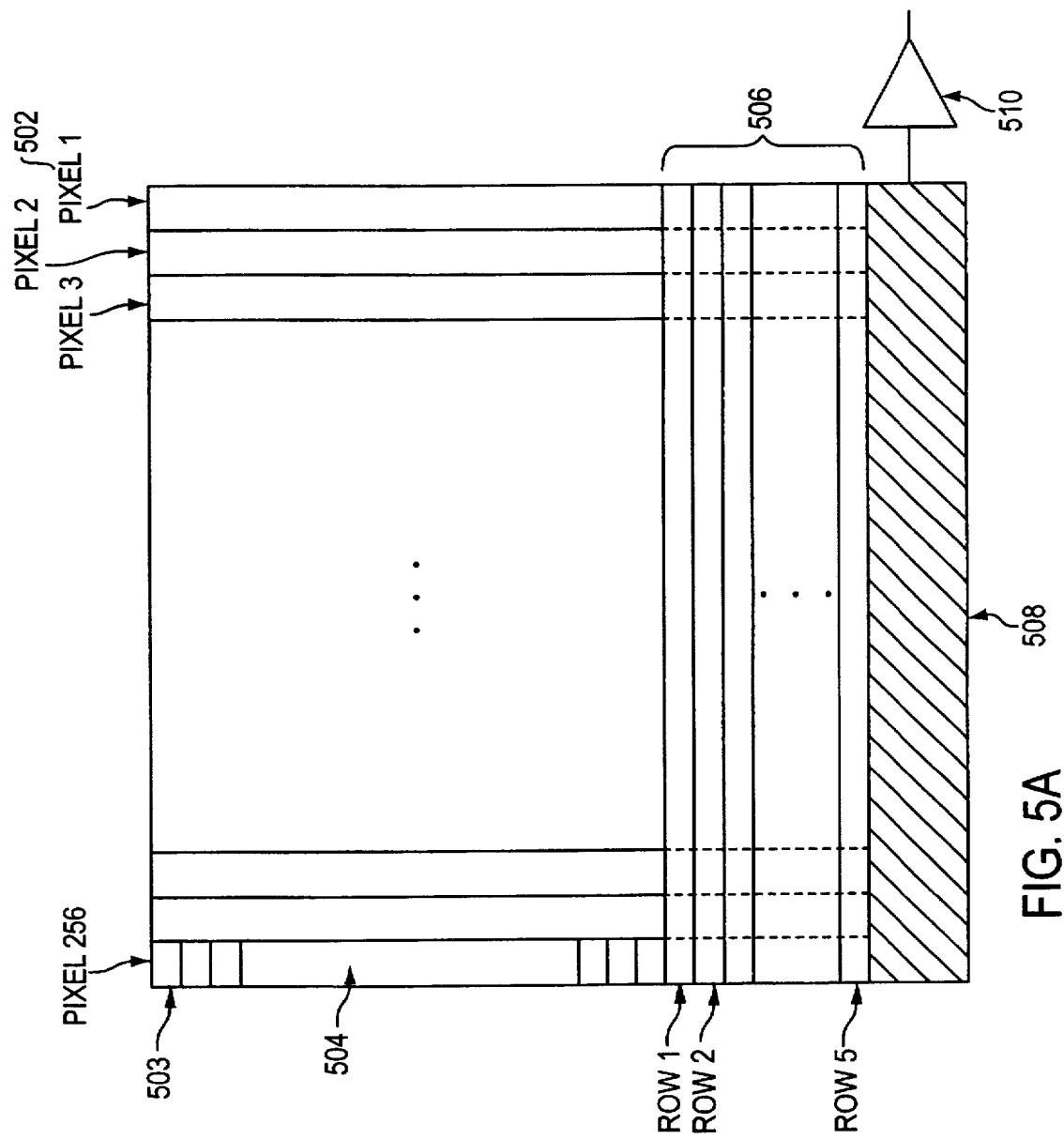
FIG. 5A illustrates an exemplary architecture of an imaging array in accordance with the present invention.
Figure 5B:
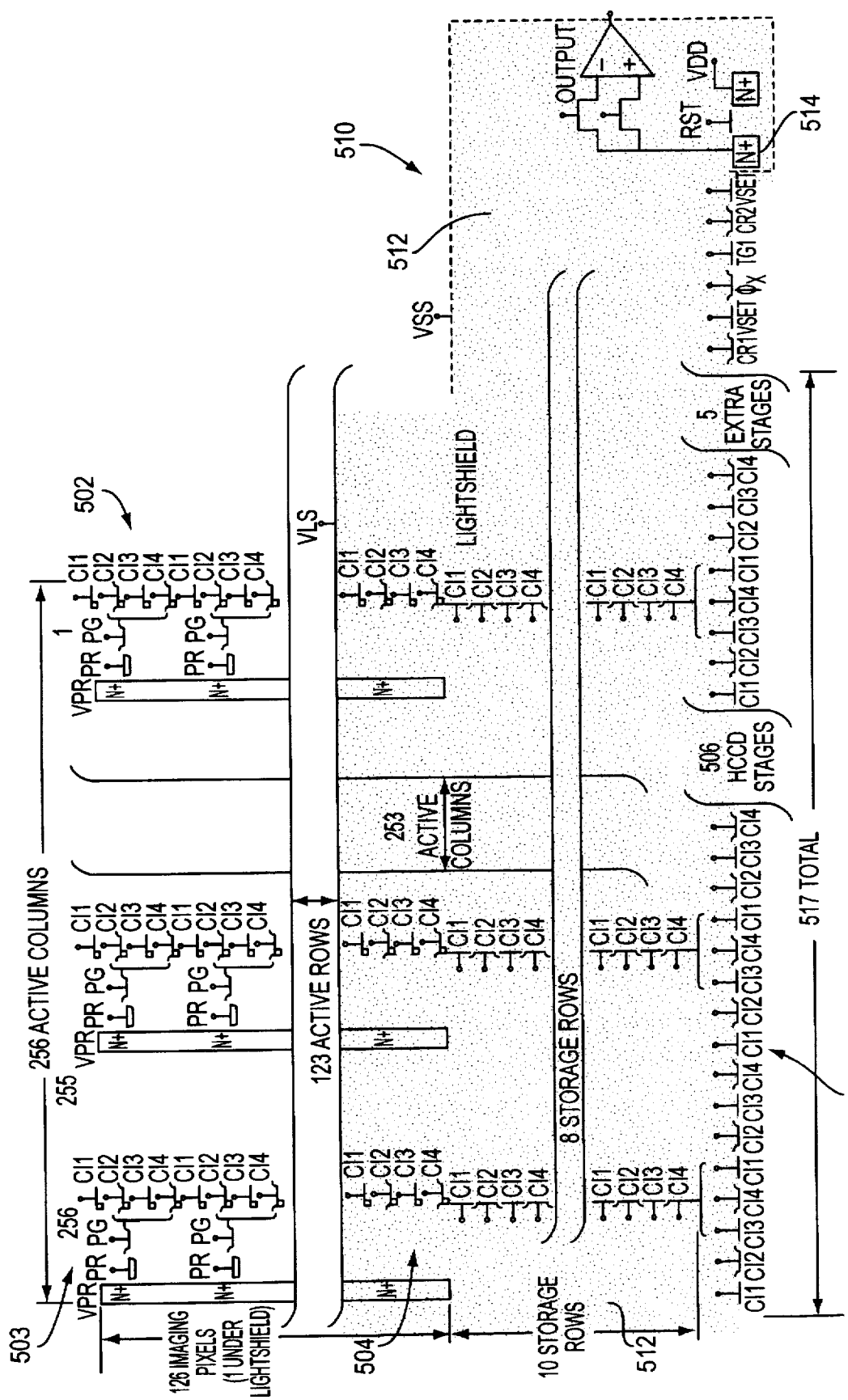
FIG. 5B illustrates an exemplary circuit block in accordance with the FIG. 5A embodiment.

FIGS. 5A and 5B illustrate an exemplary implementation of an image sensor in accordance with the present invention. This exemplary embodiment can be fabricated using a three-polysilicon layer, two-metal layer, N metal-oxide semiconductor buried channel charge-coupled device fabrication process. The two-dimensional array of the image sensor for accumulating a photocharge can be a linear array having 256 active columns of pixels, with each pixel 502 being segmented vertically into a column 503 of 126 storage elements (with one such pixel storage element in each column being located beneath a lightshield 512) represented as individual interline transfer pixel elements 504. Upon acquiring photocharge in a photocharge accumulation area of each pixel, the photocharge from all photocharge accumulation areas can be transferred to the interline transfer elements. The photocharge in the interline transfer elements for each column 502 can then be binned into a storage region 506 (i.e., a frame interline transfer architecture can be used).

Thus, a laser pulse incident upon the array illustrated in FIGS. 5A and 5B will produce a first frame of photocharge that can be binned into a row of the storage region 506 and that includes any background illumination upon which the laser signal is superimposed. Afterward, a background frame of background illumination can be acquired and binned into a second row of the storage region 506.

In accordance with exemplary embodiments, any number of rows can be included in the storage region 506 to detect any number of events. However, for purposes of illustration, the exemplary FIG. 5A–5B embodiment can include ten rows in the storage region for storing photocharge associated with five laser detection events plus five associated background frames.

After the photocharge associated with the desired number of events (e.g., five events in accordance with the exemplary FIG. 5A–5B embodiment) has been collected, the photocharge can be transferred via a clock signal from the storage region 506 into a horizontal read-out structure represented as horizontal charge-coupled device 508, and then transferred to a generating means including one or more sensing amplifiers 510 for providing a differential output. Signal charges can be converted into voltages via a resettable output node n+/p junction 514. The voltages obtained from a given pixel can then be controllably relayed to the differential inputs of an output amplifier 516.

In accordance with an exemplary embodiment, the interline transfer pixel elements 504 can be split, as described in connection with the aforementioned co-pending application. Alternately, any interline transfer type pixel can be used to accumulate photocharge, including the interline transfer type pixels illustrated in FIGS. 6A and 6B for integrating photocharge beneath a photogate 602, with FIG. 6B representing a photosite cross-section for the exemplary FIG. 6A embodiment. The photogate 602 can then transfer, in response to a clock signal, the accumulated photocharge to a vertical charge-coupled device 604 (i.e., to gates included in a vertical register). An n+ drain diode 606 and a polysilicon exposure control gate 608 (operable, for example, in response to a square pulse waveform) can be included to provide exposure control and anti-blooming. FIG. 6B illustrates exemplary potentials within the photosite during both integrate (620) and non-integrate (622) modes, and illustrates photogenerated electrons (624).

Figure 6A:
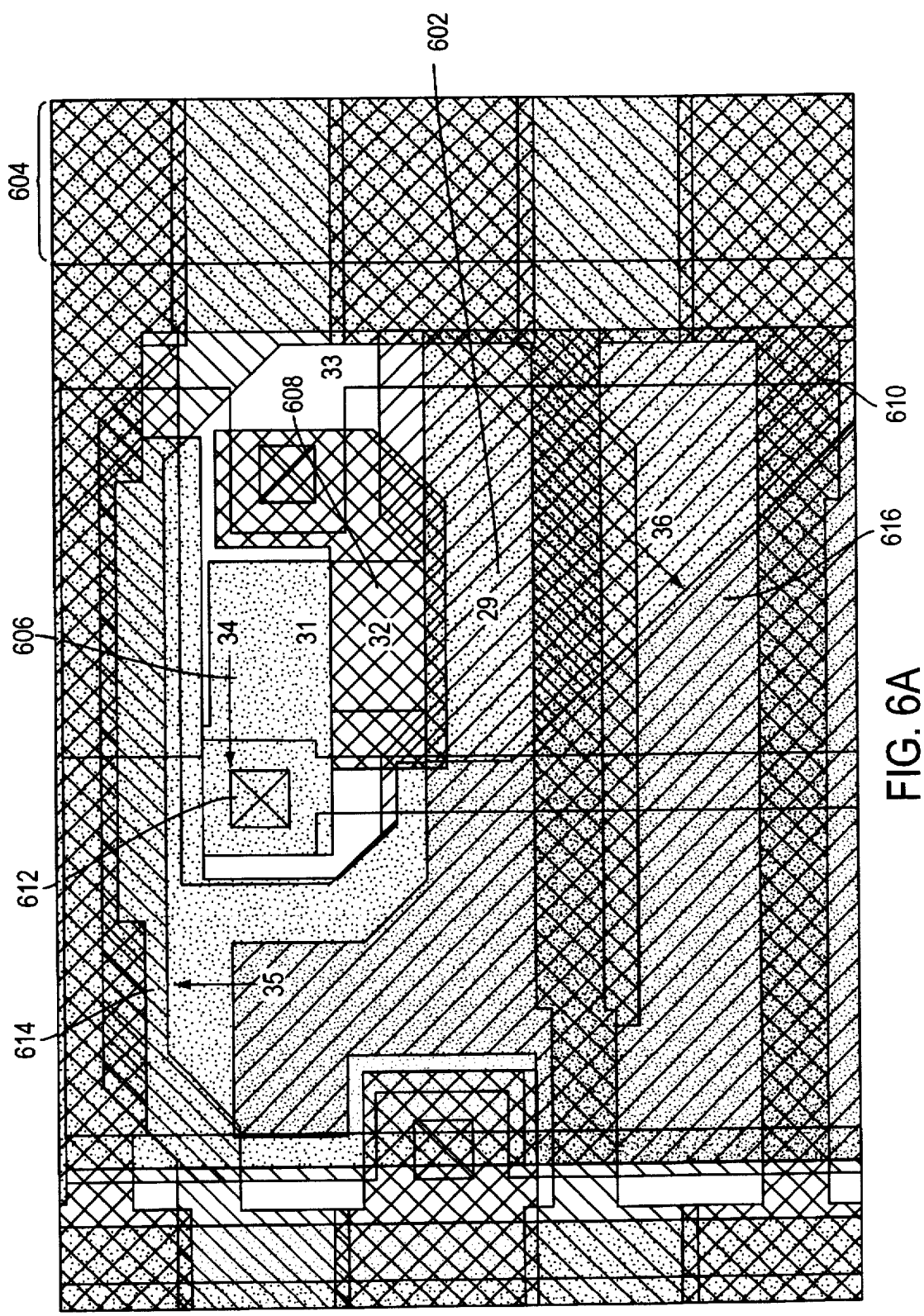
FIG. 6A illustrates an exemplary pixel of an imaging array in accordance with the present invention.
Figure 6B:
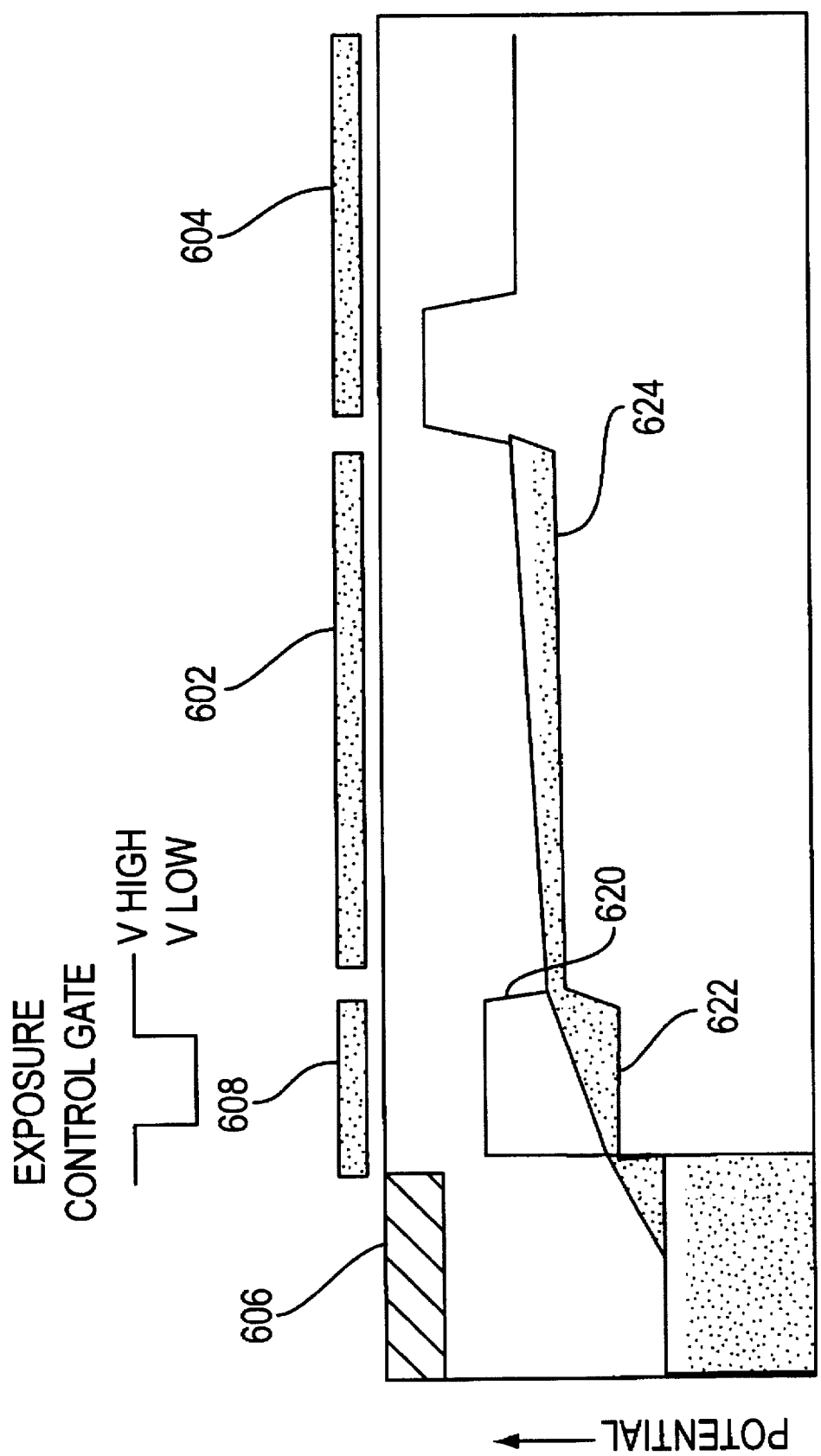
FIG. 6B illustrates a cross-section of a pixel with potential wells showing a charge draining function.

Referring to FIG. 6A, metal buses 610 can be used to provide biasing for the diode 606 and the anti-blooming gate 608. The metal buses 610 can also be used to provide clock phase signals to the vertical charge-coupled device via contact connections 612 of the polysilicon gates 608. In addition, the metal buses can be used to cover the vertical shift register 604 to avoid additional photocharge accumulation therein.

Clock signals can be provided to adjacent pixels via polysilicon interconnects 614. Beneath the photogate 602 is a barrier implant 616. A difference in potential in two regions of the photogate can be used to create a fringe field for sweeping photocharge into the non-barrier region near the vertical charge-coupled device shift register and anti-blooming/exposure control drain for improving transfer speed of photocharge from the pixel to the vertical shift register or to improve the speed of transfer of residual charge in the pixel to the drain.

In accordance with alternate embodiments, a double-density horizontal charge-coupled device as described with respect to FIG. 3 can be used. With such an embodiment, two lines of charge (i.e., a first charge associated with superimposed laser signal on background illumination, and a second photocharge associated with a background signal alone) are transferred to a single horizontal charge-coupled device having a horizontal pitch which is one-half of the horizontal pitch of pixels used to accumulate photocharge.

Figure 7:
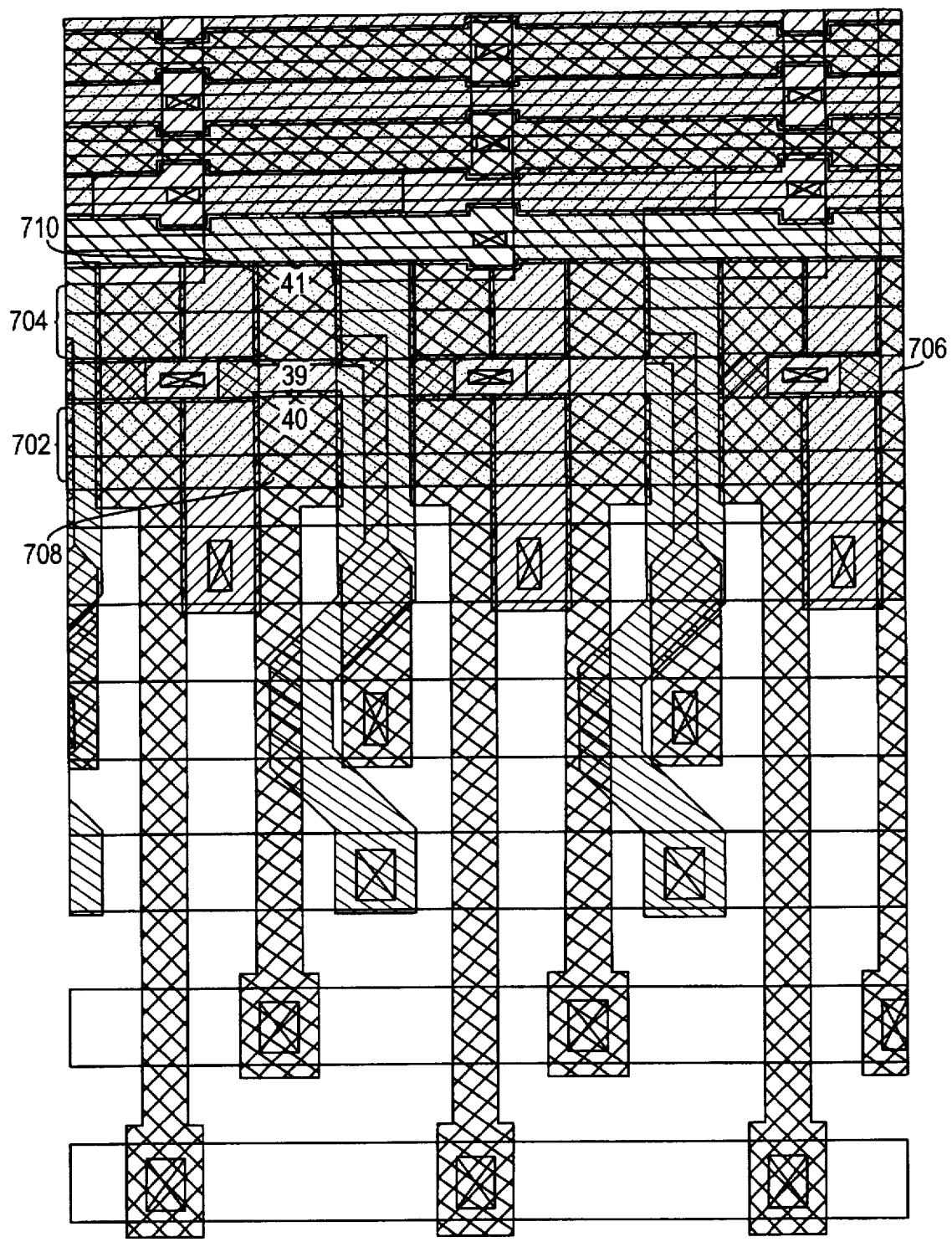
FIG. 7 illustrates an exemplary embodiment of the present invention which includes a split pixel horizontal charge-coupled device.

An alternate embodiment for implementing a split horizontal charge-coupled device is illustrated in FIG. 7, wherein a first line of photocharge containing a superimposed laser signal on background illumination is transferred into a first lower horizontal charge-coupled device 702 while a second line of photocharge containing background signal alone is transferred into an upper horizontal charge-coupled device 704. The upper and lower horizontal charge-coupled devices can be separated by a transfer gate 706. In accordance with an exemplary embodiment, both the first and second horizontal charge-coupled devices can be four phase, and a single read-out clock can be used for photocharge transfer. A separate clock signal can be used for gates immediately below a storage region 708 to facilitate photocharge transfer from the storage region to the lower horizontal charge-coupled device 702 via the upper horizontal charge-coupled device 704.

Figure 8:
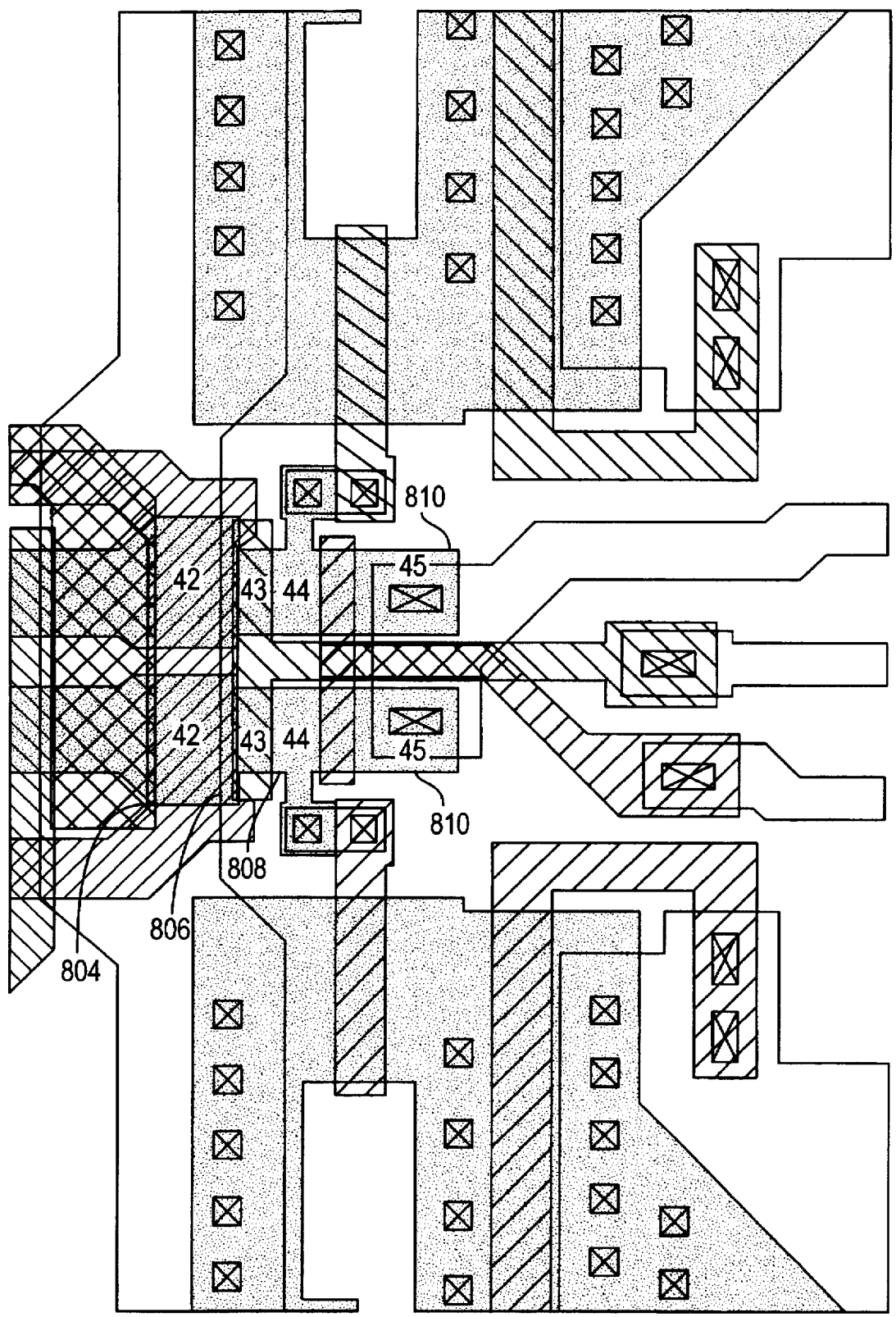
FIG. 8 illustrates an output structure of an exemplary embodiment of the present invention.

FIG. 8 illustrates an exemplary output structure wherein a last horizontal charge-coupled device clock phase 810 in each horizontal charge-coupled device of FIG. 7 is followed by a DC output gate 804, 806 and a floating diffusion diode 808. The diode 808 connects the gate of an input field-effect transistor of a two-stage source follower 810, the diode being followed by a reset gate and an output drain for resetting the output diode to a reference potential.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for detecting light energy comprising:
    means for accumulating a first photocharge from a pulse of light energy incident on the accumulating means during a first sample time, and for accumulating a second photocharge from background illumination during a second sample time, said accumulated first photocharge including said light energy pulse superimposed on said background illumination, with said accumulated first photocharge being transferred to a storage element of said accumulating means upon completion of said first sample time, and said accumulated second photocharge being transferred to said storage element of said accumulating means upon completion of said second sample time;
    means for storing said first photocharge accumulated during said first sample time and for storing said second photocharge accumulated during said second sample time;
    means for controlling exposure of the accumulating means to said light energy pulse by enabling said accumulating means to detect said light energy pulse in response to detected emission of said light energy pulse; and
    means for generating a differential output proportional to a difference between said first photocharge and said second photocharge.

2. Apparatus according to claim 1, wherein said accumulating means further includes:
    at least one column of photocharge storage sites, with photocharge from multiple photocharge sites being summed in a single storage site of said storing means.

3. Apparatus according to claim 2, wherein said photocharge accumulating means further includes:
    an image sensor having an array of interline transfer pixels.

4. Apparatus according to claim 1, wherein said storing means further includes:
    at least two rows of storage elements, a first of said at least two rows storing said first photocharge, and a second of said at least two rows storing said second photocharge.

5. Apparatus according to claim 4, further comprising:
    a read-out means connected to said storing means.

6. Apparatus according to claim 4, wherein said photocharge accumulating means further includes:
    a two-dimensional array of interline transfer pixels.

7. Apparatus according to claim 5, wherein said read-out means includes:
    a first horizontal charge-coupled device for storing said first photocharge; and
    a second horizontal charge-coupled device for storing said second photocharge.

8. Apparatus according to claim 5, wherein said read-out means includes:
    a horizontal charge-coupled device for storing both said first photocharge and said second photocharge.

9. Apparatus according to claim 5, wherein said means for generating a differential output proportional to a difference between said first photocharge and said second photocharge is operatively coupled to said read-out means.

10. Apparatus according to claim 9, further including:
    a single substrate upon which said accumulating means, said storing means and said generating means are formed.

11. Apparatus according to claim 9, wherein said generating means further includes:
    a differential output amplifier.

12. Apparatus for detecting range from a reference point to an object using light energy, said apparatus comprising:
    means for emitting a pulse of light energy at a predetermined time;
    means for accumulating a first photocharge from said light energy pulse and background illumination incident on the accumulating means during a first sample time, and for accumulating a second photocharge from said background illumination incident on the accumulating means during a second sample time;
    means for controlling exposure of the accumulating means to said light energy pulse by enabling said accumulating means to detect said light energy pulse at a predetermined sample time determined by detected emission of said light energy pulse; and
    means for generating a differential output proportional to a difference between said first photocharge and said second photocharge.

13. Apparatus according to claim 12, further including:

means for storing said first photocharge accumulated during said predetermined sample time.

14. Apparatus according to claim 12, wherein said accumulating means further includes:

a two-dimensional array of interline transfer pixels.

15. Method for detecting light energy comprising the steps of:

accumulating a first photocharge from a pulse of light energy and background illumination incident on an accumulating means during a first sample time, exposure of said accumulating means being controlled in response to detected emission of said light energy pulse;

transferring said accumulated first photocharge to a column of photocharge storage elements of said accumulating means upon completion of said first sample time;

summing photocharge from said column of photocharge storage elements;

transferring said summed photocharge to a storage means;

accumulating a second photocharge from said background illumination incident on the accumulating means during a second sample time; and generating a differential output proportional to a difference between said summed photocharge and said second photocharge.

* * * * *